US008117666B2

(12) United States Patent
Cross et al.

(10) Patent No.: US 8,117,666 B2
(45) Date of Patent: Feb. 14, 2012

(54) FILE SYSTEM OPERATION AND DIGITAL RIGHTS MANAGEMENT (DRM)

(75) Inventors: David B. Cross, Redmond, WA (US); Paul J. Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/131,884

(22) Filed: Jun. 2, 2008

(65) Prior Publication Data

US 2008/0235807 A1 Sep. 25, 2008

Related U.S. Application Data

(62) Division of application No. 10/346,429, filed on Jan. 17, 2003, now Pat. No. 7,383,586.

(51) Int. Cl.
H04L 9/32 (2006.01)

(52) U.S. Cl. .............. 726/28; 726/30; 705/51; 713/176

(58) Field of Classification Search .............. 726/27–31; 713/165, 176, 168; 705/51, 57, 59
See application file for complete search history.

(56) References Cited

U.S. PATENT DOCUMENTS

| 6,167,405 | A  | * | 12/2000 | Rosensteel et al. ................... 1/1 |
| 6,249,866 | B1 |   | 6/2001  | Brundrett et al. |
| 6,363,488 | B1 | * | 3/2002  | Ginter et al. ....................... 726/1 |
| 6,678,828 | B1 |   | 1/2004  | Pham et al. |
| 6,697,944 | B1 | * | 2/2004  | Jones et al. ................... 713/168 |
| 6,931,530 | B2 |   | 8/2005  | Pham et al. |
| 6,944,776 | B1 | * | 9/2005  | Lockhart et al. ............... 713/176 |
| 7,110,982 | B2 | * | 9/2006  | Feldman et al. ................ 705/51 |
| 7,155,415 | B2 | * | 12/2006 | Russell et al. ................... 705/59 |
| 7,213,266 | B1 | * | 5/2007  | Maher et al. ..................... 726/26 |
| 7,406,603 | B1 | * | 7/2008  | MacKay et al. ............... 713/193 |
| 7,694,342 | B2 | * | 4/2010  | Maher et al. ..................... 726/26 |
| 7,761,706 | B2 | * | 7/2010  | Lambert ....................... 713/165 |
| 2002/0019935 | A1 | | 2/2002  | Andrew et al. |
| 2002/0141574 | A1 | | 10/2002 | Henson et al. |
| 2003/0046366 | A1 | | 3/2003  | Pardikar et al. |
| 2006/0018484 | A1 | | 1/2006  | Yoshihiro et al. |
| 2008/0216169 | A1 | | 9/2008  | Naizhen et al. |

OTHER PUBLICATIONS

Marks, "Using Win2000's Foolproof Encryption", Network Computing, Oct. 30, 2000, pp. 156-158.
"Microsoft Windows XP OS: Encrypting File System in Windows XP and Windows.NET Server", Microsoft Corporation, Aug. 2002, 60 pages.
Wolthusen, "Security Policy Enforcement at the File System Level in the Wondows NT Operating System Family", 2001 IEEE pp. 55-63.

* cited by examiner

*Primary Examiner* — Zachary A Davis
(74) *Attorney, Agent, or Firm* — Lee & Hayes, PLLC

(57) ABSTRACT

File system interaction with digital rights management (DRM) is facilitated by enabling one or more file system components to be DRM-aware. These one or more file system components may be part of a computer operating system. An exemplary system implementation includes: one or more processors; and one or more media in operative communication therewith, the media storing one or more file system components that are configured to provide content having DRM controls to a requesting program in either a raw form or a decrypted form in dependence on whether the DRM controls comprise simple DRM content controls or complex DRM content controls. In another exemplary system implementation, the one or more file system components are configured to provide files with simple DRM content controls to requesting applications in a decrypted form and to provide files with complex DRM content controls to requesting applications in an unaltered form.

20 Claims, 8 Drawing Sheets

FILE SYSTEM OPERATION AND DIGITAL RIGHTS MANAGEMENT (DRM)

CROSS REFERENCE TO RELATED MATTER

This application is a divisional of U.S. Pat. No. 7,383,586, filed on Jan. 17, 2003 and issued on Jun. 3, 2008, which is incorporated herein by reference in its entirety.

TECHNICAL FIELD

This disclosure relates in general to digital rights management (DRM) and in particular, by way of example but not limitation, to enabling a file system component to be DRM-aware and to be able to handle at least some DRM-controlled content.

BACKGROUND

Computers are utilized in personal, professional, educational and other areas and fields to perform functions, provide services, and/or facilitate access to content. Examples of such content include text, audio, images, audiovisual or multimedia material, executables, some combination thereof, and other content. Creators of much of this content often rely on intellectual property protections such as copyright to secure control and compensation for their works. However, rights holders also usually wish to supplement these legal protections with technical protections. This is especially true of content that is in a digital form because digital content can be copied, sold, shared, transferred, viewed, otherwise used, etc. without undergoing any degradation. Consequently, there is no natural technical-based expiration or other limitation on digital content once it has been disseminated.

One technique for offering technical protections (i.e., control) over content is digital rights management (DRM). DRM can limit, for example, a user's access to content. Such limitations may include, for instance, limiting the number of times content may be experienced, limiting the number of transfers of content, limiting the amount of time content may be experienced, limiting allowable modifications to content, and so forth. DRM may be implemented in any of a myriad of manners; however, any of these myriad of manners are generally intended to provide technical controls over content.

Computers typically employ application programs in order to provide the aforementioned functions, services, and content access. These application programs facilitate content viewing, content modifying, and content experiencing in general. Traditionally, in order for DRM to be effective in controlling content use, the application that is attempting to interact with DRM-controlled content must be DRM-aware and capable of enforcing DRM controls. This conventional approach to DRM may be effective for new applications being developed today for a DRM-enabled world. Unfortunately, there are many legacy applications that are already present on computers and that have no understanding of or ability to interact with DRM-controlled content.

Accordingly, there is a need for schemes and/or techniques to enable legacy applications to interact with DRM-controlled content.

SUMMARY

File system interaction with digital rights management (DRM) is facilitated by enabling one or more file system components to be DRM-aware. These one or more file system components may be, for example, part of a computer operating system. An exemplary system implementation for file operations and DRM includes: one or more processors; and one or more media in operative communication with the one or more processors, the one or more media storing one or more file system components that are adapted to execute on the one or more processors and that are configured to provide content having DRM controls to a requesting program in either a raw form or a decrypted form in dependence on whether the DRM controls comprise simple DRM content controls or complex DRM content controls.

Another exemplary system implementation for file system operations and DRM includes: one or more processors; and one or more media in operative communication with the one or more processors, the one or more media storing one or more file system components that are adapted to execute on the one or more processors and that are configured to provide files with simple DRM content controls to requesting applications in a decrypted form and to provide files with complex DRM content controls to requesting applications in an unaltered form.

An exemplary electronically-accessible media implementation includes electronically-executable instructions that, when executed, direct an electronic apparatus to perform actions including: inspecting one or more DRM controls from a tag of DRM-controlled content; determining whether the one or more DRM controls are simple DRM controls; and providing the DRM-controlled content in a decrypted form when the one or more DRM controls are determined to be simple DRM controls; wherein the actions of inspecting, determining, and providing are performed, at least partly, by one or more file system components.

Other method, system, media, and arrangement implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
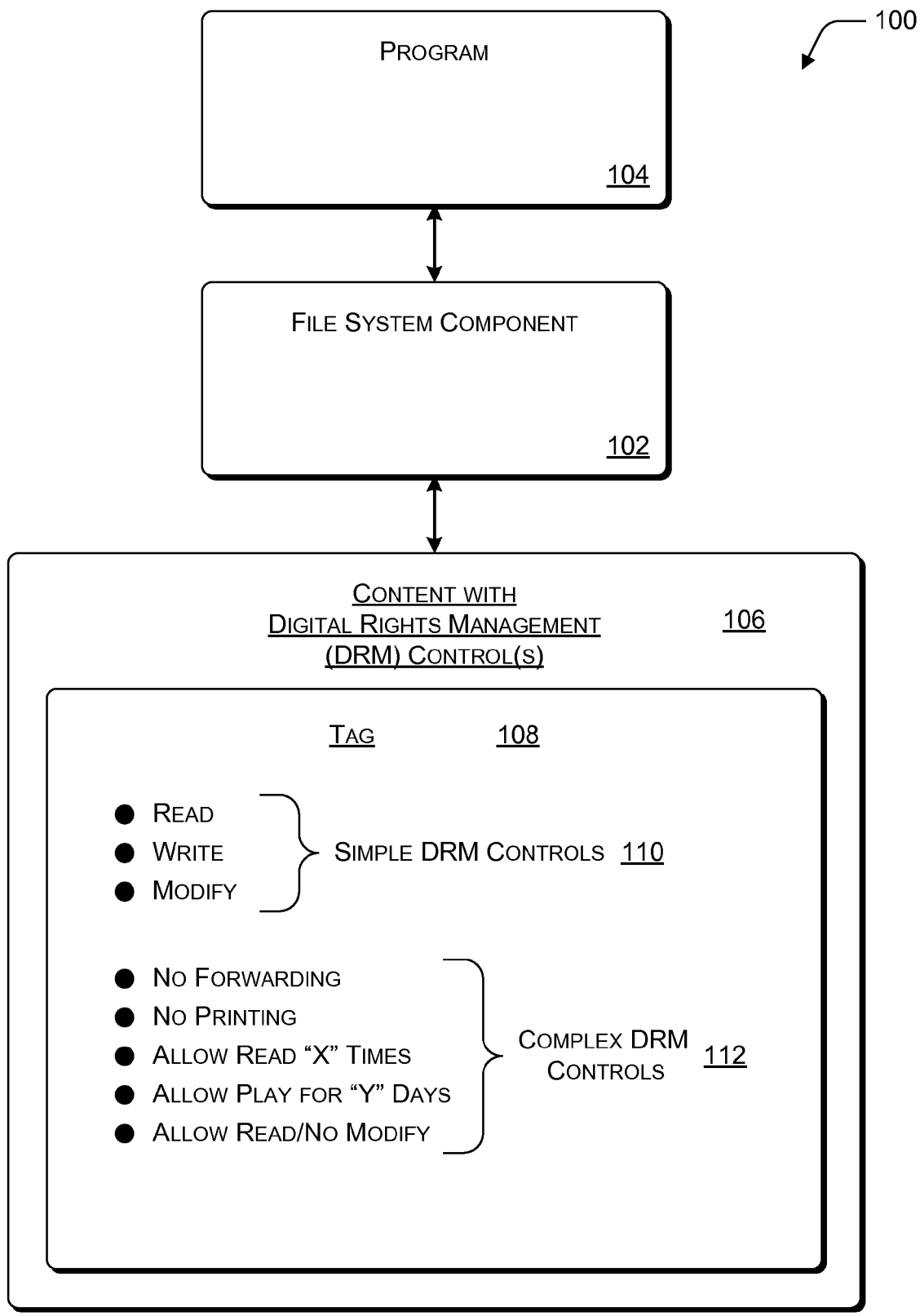
FIG. 1 illustrates an exemplary general approach to file system operation and digital rights management (DRM).

FIG. 1 illustrates an exemplary general approach 100 to file system operation and digital rights management (DRM). At least one file system component 102 is in communication with a program 104 and content with DRM control(s) 106. File system component 102, program 104, and content with DRM control(s) 106 may be functioning and/or existing within a single computer or distributed between or among multiple computers. An exemplary computer operating environment with an optional remote computing device aspect is described below with particular reference to FIG. 5.

File system component 102 may be implemented as all or part of a file system of an operating system (OS). For example, it may be the entire file system of the OS or one or more device drivers thereof. It may also be realized as a middleware component. Program 104 may be any application, code, software, middleware, etc. that attempts to access content with DRM control(s) 106.

In a described implementation, content with DRM control(s) 106 may be constrained by one or more DRM controls on the use of the content. As illustrated, a tag 108 indicates which DRM control or controls are applied to content 106. Tag 108 may be any sort of tag or tags that may be associated with content 106. Examples of tag 108 include a file header, an alternate stream (such as an "NTFS" alternate stream), an application manifest, and so forth.

DRM controls are divided into simple DRM controls 110 and complex DRM controls 112. Simple or basic DRM controls 110 include those DRM controls that can be enforced by a file system such as file system component 102. Thus, simple DRM controls 110 include, for example, those controls directed to read, write, and/or modify.

Complex or rich DRM controls 112 include those DRM controls that cannot be enforced by a file system. Complex DRM controls 112 include, for example, no forwarding, no printing, allowing "X" reads, allowing plays for "Y" days, allowing reads without any modifications (e.g., thus preventing "save as" functions), and so forth. Although eight different DRM controls are all illustrated in tag 108, any number of these or other possible DRM controls may alternatively be indicated in tag 108.

In operation, program 104 requests access to content with DRM control(s) 106. File system component 102 inspects tag 108 to see which DRM control(s) are applicable to content 106. If tag 108 indicates that only one or more simple DRM controls 110 constrain the use of content 106, then file system component 102 performs or causes to be performed DRM-related functions. For example, file system component 102 decrypts (e.g., directly decrypts or indirectly causes to be decrypted) content with DRM control(s) 106. Additional exemplary DRM-related functions are described below. After decryption of the content with DRM control(s) 106, the decrypted content is provided to program 104.

If, on the other hand, tag 108 indicates that one or more complex DRM controls 112 constrain the use of content 106, then file system component 102 provides content with DRM control(s) 106 to the requesting program 104 in a raw state with all DRM protections in force (e.g., still encrypted, etc.).

Using approach 100 to file system operation and DRM enables a number of possibilities. For example, legacy applications that are not DRM-aware may be given access to DRM-controlled content in at least limited situations. For instance, an anti-virus program may access and review files having content with DRM control(s) 106 even when the anti-virus program cannot understand or does not wish to handle DRM controls on content. As another instance, DRM controls can be used with legacy applications that have no innate understanding of DRM functionality to establish a group or groups that are permitted to access content with such legacy applications when the DRM control(s) on such content are simple DRM controls 110.

Figure 2:
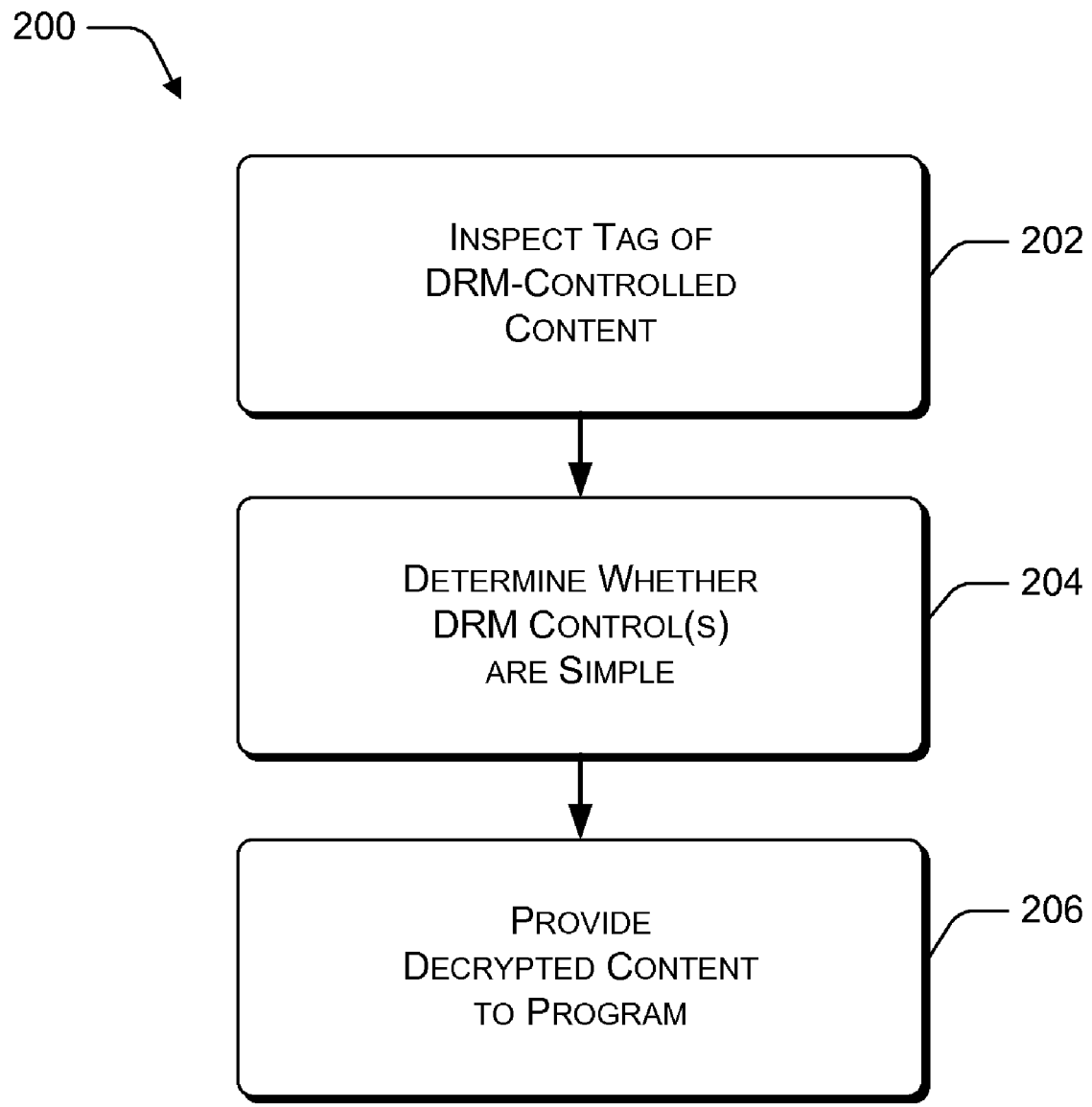
FIG. 2 is a flow diagram that illustrates an exemplary general method for file system operation with DRM.

FIG. 2 is a flow diagram 200 that illustrates an exemplary general method for file system operation with DRM. Flow diagram 200 includes three (3) blocks 202, 204, and 206. Actions for these blocks 202, 204, and 206 may be performed, for example, by a file system component 102 (of FIG. 1). At block 202, a tag of DRM-controlled content is inspected. For example, the file system component 102 may inspect a tag 108 of content with DRM control(s) 106. At block 204, it is determined whether DRM control(s) as indicated in the tag of the DRM-controlled content are simple. For example, it may be determined from the tag 108 of the content with DRM control(s) 106 that any DRM controls thereon are simple DRM controls 110. At block 206, the content of the DRM-controlled content is provided to a requesting program in a decrypted form. For example, the content 106 is provided in a decrypted form to a program 104.

Figure 3:
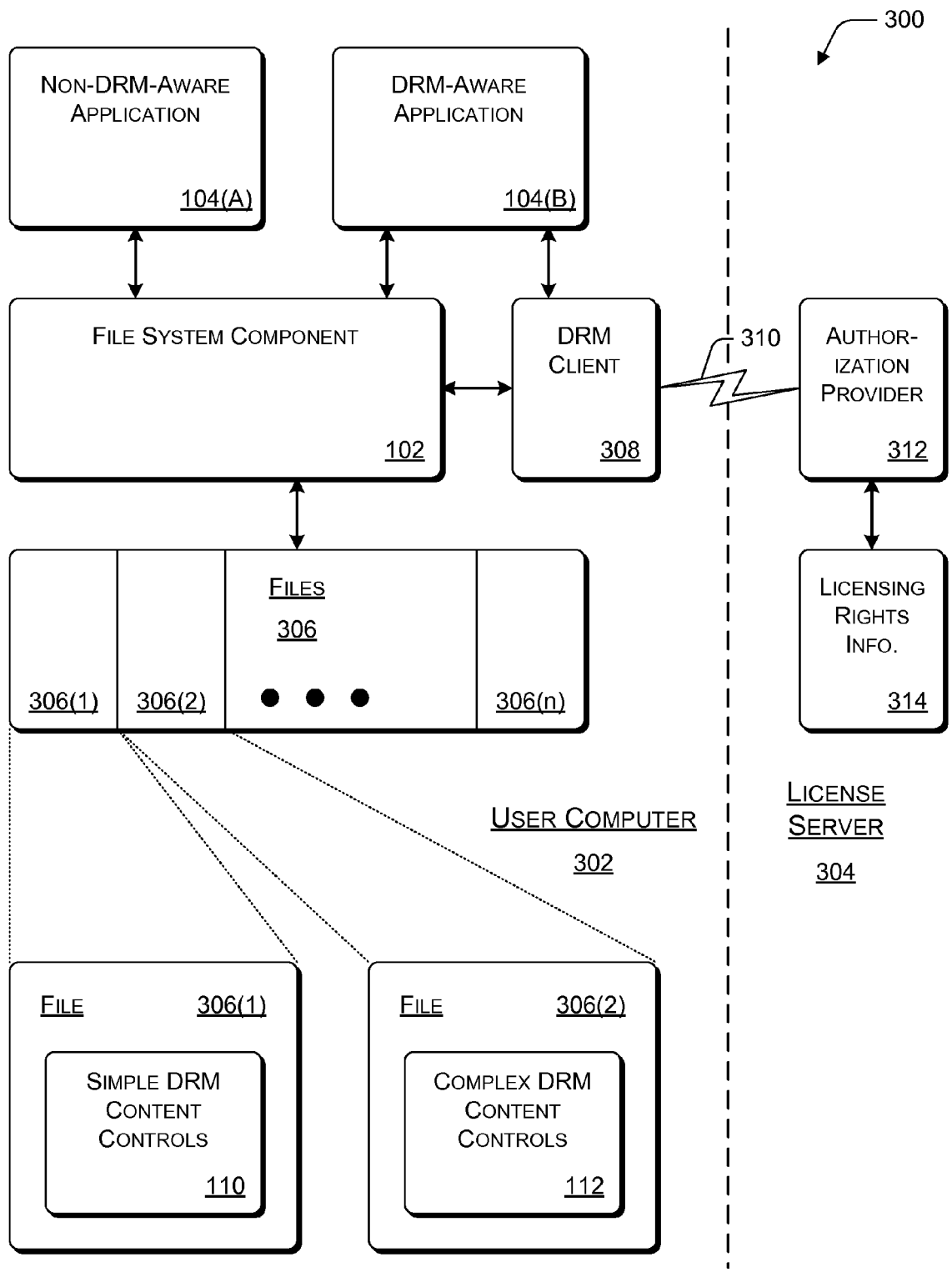
FIG. 3 illustrates another exemplary general approach to file system operation and DRM.

FIG. 3 illustrates another exemplary general approach 300 to file system operation and DRM. As illustrated, approach 300 includes a user computer 302 and a license server 304. A user and/or a program of user computer 302 desires to access DRM-controlled content, and license server 304 has the ability to facilitate the performance of DRM functions with reference to the desired DRM-controlled content.

In a described implementation, a non-DRM-aware application 104(A) and a DRM-aware application 104(B) access one or more files 306 through file system component 102. Files 306 include multiple files 306(1), 306(2) ... 306(n). File 306(1) comprises content that is associated with simple DRM content controls 110. File 306(2) comprises content that is associated with complex DRM content controls 112. Simple DRM content controls 110 and complex DRM content controls 112 may be indicated respectively for files 306(1) and 306(2) at, for example, a tag of the file and/or the content thereof.

An application such as DRM-aware application 104(B) may be considered DRM-aware when it is capable of understanding and enforcing DRM controls of and on content and the files that include such content. Hence, in the abstract, DRM-aware application 104(B) is capable of accessing files 306(1) and 306(2) and interacting with a DRM client 308 so as to facilitate use of both file 306(1) and file 306(2) to the extent permitted by simple DRM content controls 110 and complex DRM content controls 112, respectively. Non-DRM-aware application 104(A), on the other hand, is not capable of interacting with DRM client 308 and is thus unable to access or use file 306(1) or file 306(2) absent intervention and aid by file system component 102.

In a described implementation, file system component 102 is capable of understanding and enforcing DRM controls of and on content and the files that include such content. Hence, file system component 102 is capable of interacting with DRM client 308 so as to facilitate use of certain files 306 that include DRM-controlled content. In this sense, file system component 102 is DRM-aware. For example, file system component 102 may have a manifest or other type of tag that delineates to DRM client 308 what or which DRM-controlled content file system component 102 is permitted to access. However, file system component 102 is authorized from a DRM perspective to directly handle those files 306 that include simple DRM content controls 110.

Operation of file system component 102, along with certain other illustrated elements of approach 300, is described in four (4) permutations in which each of non-DRM-aware application 104(A) and DRM-aware application 104(B) each attempt to access file 306(1) and file 306(2). In a first of the four described permutations, non-DRM-aware application 104(A) attempts to access file 306(1) with simple DRM content controls 110. When file system component 102 receives a request for file 306(1), file system component 102 detects that file 306(1) is protected with DRM content controls.

Specifically, file system component 102 detects that file 306(1) is protected with simple DRM content controls 110. Because the content controls are simple DRM controls 110, file system component 102 acts on behalf of non-DRM-aware application 104(A) by interacting with DRM client 308. File system component 102 provides an identity or user to DRM client 308. This identity or user may be representative of the human user of user computer 302 and/or the requesting application. Thus, this identity may establish or define a user context for DRM.

DRM client 308 uses communication link 310 to contact license server 304. Communication link 310 may be a wireless or wireline link, a public or private network link, a local or wide are network link, some combination thereof, and so forth. Furthermore, communication link 310 may be established using one or more of application protocol(s), remote procedure calls (RPCs), simple object access protocol (SOAP) messages, and so forth. Additional examples of communications between two computers are described below with particular reference to FIG. 5.

Specifically, DRM client 308 contacts authorization provider component 312 via communication link 310. DRM client 308 forwards the identity to authorization provider 312, which has access to licensing rights information 314. Authorization provider 312 utilizes the forwarded identity context to reference information related thereto that is located in licensing rights information 314.

Authorization provider 312 informs DRM client 308 as to what rights have been granted to the identity. If the identity has rights to the DRM-controlled content of file 306(1), DRM client 308 uses the appropriate key in accordance with DRM protocols to decrypt the content. File system component 102 may then provide the decrypted content of file 306(1) to non-DRM-aware application 104(A). Any DRM controls of simple DRM content controls 110 for file 306(1) are enforceable by file system component 102 as non-DRM-aware application 104(A) uses file 306(1).

In a second of the four described permutations, non-DRM-aware application 104(A) attempts to access file 306(2) with complex DRM content controls 112. When file system component 102 receives a request for file 306(2), file system component 102 detects that file 306(2) is protected with DRM content controls. Specifically, file system component 102 detects that file 306(2) is protected with complex DRM content controls 112. Because the content controls are complex DRM controls 112, file system component 102 does not act on behalf of non-DRM-aware application 104(A).

In other words, file system component 102 does not interact with DRM client 308 if the requested file has complex DRM content controls 112. Instead, file system component 102 provides file 306(2) to non-DRM-aware application 104 (A) in an unaltered form. Because file 306(2) is encrypted in accordance with DRM protocols and non-DRM-aware application 104(A) is not able to handle files with DRM controls, non-DRM-aware application 104(A) is unable to access file 306(2) and the DRM-related protections for file 306(2) are enforced as intended. Alternatively, as described further below with particular reference to FIG. 6/Element 626, file system component 102 may only provide file 306(2) to applications that are validated as being properly DRM-aware.

In a third of the four described permutations, DRM-aware application 104(B) attempts to access file 306(1) with simple DRM content controls 110. When file system component 102 receives a request for file 306(1), file system component 102 detects that file 306(1) is protected with DRM content controls. Specifically, file system component 102 detects that file 306(1) is protected with simple DRM content controls 110. Because the content controls are simple DRM controls 110, file system component 102 acts on behalf of DRM-aware application 104(B) by interacting with DRM client 308.

As described above with respect to the first permutation, DRM client 308 eventually decrypts the content of file 306(1) for file system component 102, assuming that the current/user identity context for DRM-aware application 104(B) as provided to DRM client 308 has the appropriate DRM-related access rights. File system component 102 may then provide the decrypted content of file 306(1) to DRM-aware application 104(B). Any DRM controls of simple DRM content controls 110 for file 306(1) are enforceable by file system component 102 as DRM-aware application 104(B) uses file 306(1).

In an alternative implementation, file system component 102 may forward files with any DRM content controls 110 and/or 112 to DRM-aware application 104(B) in an unaltered form. This permits DRM-aware application 104(B) to access such files and enforce any DRM controls without direct intervention by file system component 102. File system component 102 may, in such cases, perform a check to determine whether an application 104 is a DRM-aware application 104 (B), either as a matter of course or in response to an assertion by an application 104 that it is DRM-aware. This check may be accomplished using, for example, digital signatures of applications, manifests of applications, and so forth.

In a fourth of the four described permutations, DRM-aware application 104(B) attempts to access file 306(2) with complex DRM content controls 112. When file system component 102 receives a request for file 306(2), file system component 102 detects that file 306(2) is protected with DRM content controls. Specifically, file system component 102 detects that file 306(2) is protected with complex DRM content controls 112. Because the content controls are complex DRM controls 112, file system component 102 does not act on behalf of DRM-aware application 104(B).

In other words, file system component 102 does not interact with DRM client 308 if the requested file has complex DRM content controls 112. Instead, file system component 102 provides file 306(2) to DRM-aware application 104(B) in an unaltered form. This provisioning may be accomplished by giving a pointer, a handle, etc. for file 306(2) to DRM-aware application 104(B). Although file 306(2) is encrypted in accordance with DRM protocols, DRM-aware application 104(B) is able to handle files with DRM controls. Consequently, DRM-aware application 104(B) interacts with DRM client 308 (without needing to make any additional calls to file system component 102).

This interaction may result in the verification of identity and any accompanying DRM rights, the validation of DRM-aware application 104(B), the decryption of the content of file 306(2), and so forth, as described above with respect to the first permutation. DRM-aware application 104(B) is thus provided with a decrypted version of the DRM-controlled content of file 306(2). The DRM-related protections for file 306 (2), as enumerated in complex DRM content controls 112, are enforced by the DRM provisions of DRM-aware application 104(B).

Hence, file system component 102 may provide access to files 306 having content with simple DRM content controls 110 to any type of application. Such simple DRM protections are enforced by file system component 102. For files 306 having content with complex DRM content controls 112, file system component 102 provides these files to requesting applications in raw, unaltered form. Consequently, only appropriately DRM-aware applications 104(B) can access and otherwise use files 306 having content with complex DRM content controls 112.

Figure 4:
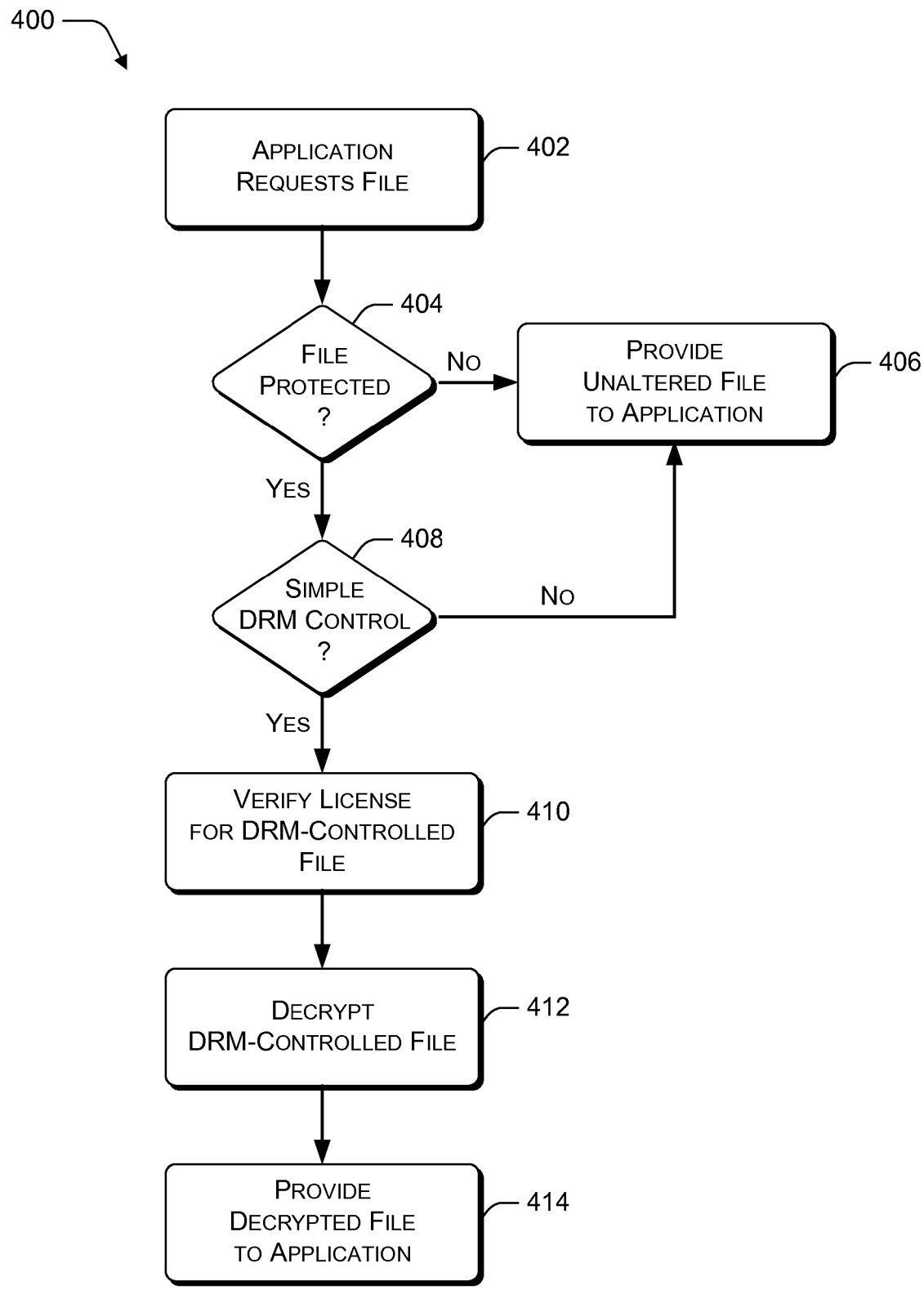
FIG. 4 is a flow diagram that illustrates another exemplary general method for file system operation with DRM.

FIG. 4 is a flow diagram 400 that illustrates another exemplary general method for file system operation with DRM. Flow diagram 400 includes seven (7) blocks 402-414. Actions for these blocks 402-414 may be performed, for example, by a user computer 302 (of FIG. 3). At block 402, an application requests a file. For example, a non-DRM-aware application 104(A) or a DRM-aware application 104(B) may request a file 306 from a file system component 102.

At block 404, it is determined whether the requested file is protected. For example, the file system component 102 may review the file 306 to see if it is encrypted, such as when the file 306 is protected with DRM. If the file is not protected, then the requested file is provided unaltered to the requesting application at block 406. For example, the file system component 102 may pass a handle to the unaltered file 306 to the requesting application 104(A,B). Regardless of whether the requesting application 104 is a non-DRM-aware application 104(A) or a DRM-aware application 104(B), the requesting application 104(A,B) may access the unaltered and unprotected file 306.

If, on the other hand, the requested file is determined to be protected (at block 404), then it is determined whether the requested file is protected with simple DRM control(s) at block 408. For example, the file system component 102 may inspect a tag of file 306(1,2) to determine whether it is protected with simple DRM content controls 110. If the requested file is not protected with simple DRM control(s), then the requested file is provided unaltered to the requesting application at block 406. In this case, if the requesting application 104(A,B) is a non-DRM-aware application 104(A), then the DRM-protected file 306(2) with complex DRM content controls 112 will not be accessed. If the requesting application 104(A,B) is a DRM-aware application 104(B), then the DRM-protected file 306(2) may be accessed, depending on the result of a DRM analysis effectuated by interaction between the DRM-aware application 104(B) and a DRM client 308.

If, on the other hand, the requested file is determined to be protected with simple DRM control(s) (at block 408), then a license for the DRM-controlled file is verified at block 410. For example, the file system component 102 interacts with the DRM client 308 in order to have the identity context verified with a license server 304 at least with regard to the requested file 306(1) with the simple DRM content controls 110. At block 412, the DRM-controlled file is decrypted. For example, the DRM client 308 uses a key, which is acquired and/or authorized through exchanges over a communication link 310 with an authorization provider 312, to decrypt the requested file 306(1).

At block 414, the requested file in a decrypted form is provided to the requesting application. For example, the file system component 102 may pass a handle to the decrypted file 306(1) to the requesting application 104(A,B). Regardless of whether the requesting application 104(A,B) is a non-DRM-aware application 104(A) or a DRM-aware application 104(B), the requesting application 104(A,B) may access the decrypted file 306(1). The file system component 102 may enforce the simple DRM content control(s) 110 of the decrypted file 306(1).

Figure 5:
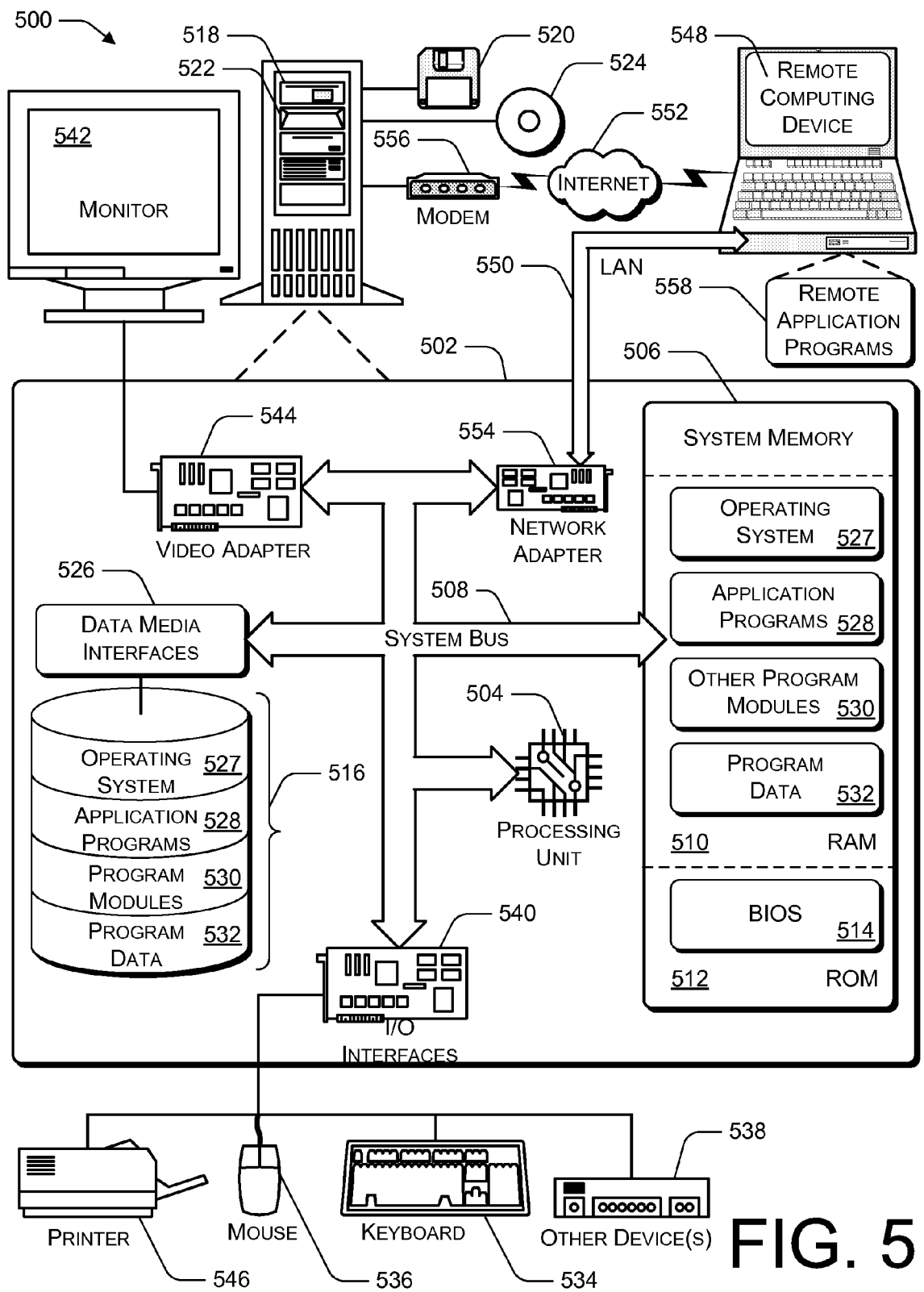
FIG. 5 illustrates an exemplary computing operating environment that is capable of (wholly or partially) implementing at least one approach, method, and/or process as described herein.

FIG. 5 illustrates an exemplary computing operating environment 500 that is capable of (fully or partially) implementing at least one approach, method, and/or process for enabling file system operation with DRM as described herein. Computing environment 500 may be utilized in the computer and network architectures described below.

Exemplary computing operating environment 500 is only one example of a computing environment and is not intended to suggest any limitation as to the scope of use or functionality of the applicable computer (including general electronic device) and network architectures. Neither should computing environment 500 be interpreted as having any dependency or requirement relating to any one or any combination of components as illustrated in FIG. 5.

Additionally, file system operation with DRM may be implemented with numerous other general purpose or special purpose computing system environments or configurations. Examples of well known computing systems, environments, and/or configurations that may be suitable for use include, but are not limited to, personal computers, server computers, thin clients, thick clients, personal digital assistants (PDAs) or mobile telephones, hand-held or laptop devices, multiprocessor systems, microprocessor-based systems, set top boxes, programmable consumer electronics, video game machines, network PCs, minicomputers, mainframe computers, distributed computing environments that include any of the above systems or devices, and so forth.

Implementations with file system component(s) interacting with DRM functionality may be described in the general context of electronically-executable instructions. Generally, electronically-executable instructions include routines, programs, objects, components, data structures, etc. that perform particular tasks or implement particular abstract data types.

DRM-aware file system component(s), as described in certain implementations herein, may also be practiced in distributed computing environments where tasks are performed by remotely-linked processing devices that are connected through a communications network. Especially in a distributed computing environment, electronically-executable instructions may be located in separate storage media, executed by different processors, and/or propagated over transmission media. For example, file system commands may be called over a network and executed on a remote computing device that is not directly attached to a computer in which an application is running and attempting to access DRM-protected content.

Computing environment 500 includes a general-purpose computing device in the form of a computer 502, which may comprise any electronic device with computing and/or processing capabilities. The components of computer 502 may include, but are not limited to, one or more processors or processing units 504, a system memory 506, and a system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of electronically-accessible media. Such media may be any available media that is accessible by computer 502 or another electronic device, and it includes both volatile and non-volatile media, removable and non-removable media, and storage and transmission media.

System memory 506 includes electronically-accessible media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules/instructions that are immediately accessible to and/or being presently operated on by processing unit 504.

Computer 502 may also include other removable/non-removable and/or volatile/non-volatile electronic storage media. By way of example, FIG. 5 illustrates a hard disk drive 516 for reading from and writing to a (typically) non-removable, non-volatile magnetic media (not separately shown); a magnetic disk drive 518 for reading from and writing to a (typically) removable, non-volatile magnetic disk 520 (e.g., a "floppy disk"); and an optical disk drive 522 for reading from and/or writing to a (typically) removable, non-volatile optical disk 524 such as a CD-ROM, DVD-ROM, or other optical media. Hard disk drive 516, magnetic disk drive 518, and optical disk drive 522 are each connected to system bus 508 by one or more data media interfaces 526. Alternatively, hard disk drive 516, magnetic disk drive 518, and optical disk drive 522 may be connected to system bus 508 by one or more other separate or combined interfaces (not shown).

The disk drives and their associated electronically-accessible media provide non-volatile storage of electronically-executable instructions, such as data structures, program modules, and other data for computer 502. Although exemplary computer 502 illustrates a hard disk 516, a removable magnetic disk 520, and a removable optical disk 524, it is to be appreciated that other types of electronically-accessible media may store instructions that are accessible by an electronic device, such as magnetic cassettes or other magnetic storage devices, flash memory cards, CD-ROM, digital versatile disks (DVD) or other optical storage, random access memories (RAM), read only memories (ROM), electrically erasable programmable read-only memories (EEPROM), and so forth. In other words, any electronically-accessible media may be utilized to realize the storage media of the exemplary computing system and environment 500.

Any number of program modules (or other units or sets of instructions) may be stored on hard disk 516, magnetic disk 520, optical disk 524, ROM 512, and/or RAM 510, including by way of example, an operating system 527, one or more application programs 528, other program modules 530, and program data 532. By way of example only, operating system 527 may comprise file system component 102, application programs 528 may comprise program and/or applications 104, and program data 532 may comprise files 306 and/or the content 106 thereof. DRM client 308 may also optionally comprise part of operating system 527. If so, DRM client 308 may exist as part of operating system 527 at the time of original manufacture, or it may be subsequently installed on top of operating system 527, and so forth. Alternatively, DRM client 308 may be a middleware component of computer 502 and/or user computer 302 (of FIG. 3).

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to processing unit 504 via input/output interfaces 540 that are coupled to system bus 508. However, they may instead be connected by other interface and bus structures, such as a parallel port, a game port, a universal serial bus (USB) port, an IEEE 1394 interface, an IEEE 802.11 interface, and so forth.

A monitor 542 or other type of display device may also be connected to system bus 508 via an interface, such as a video adapter 544. In addition to monitor 542, other output peripheral devices may include components such as speakers (not shown) and a printer 546, which may be connected to computer 502 via input/output interfaces 540.

Computer 502 may operate in a networked environment using logical connections to one or more remote computers, such as a remote computing device 548. By way of example, remote computing device 548 may be a personal computer, a portable computer (e.g., laptop computer, tablet computer, PDA, mobile station, etc.), a server, a router, a network computer, a peer device, other common network node, or other computer type as listed above, and so forth. Remote computing device 548 is illustrated as a portable computer that may include many or all of the elements and features described herein relative to computer 502.

Logical connections between computer 502 and remote computer 548 are depicted as a local area network (LAN) 550 and a general wide area network (WAN) 552. Such networking environments are commonplace in offices, enterprise-wide computer networks, intranets, the Internet, fixed and mobile telephone networks, other wireless networks, and so forth.

When implemented in a LAN networking environment, computer 502 is connected to a local area network 550 via a network interface or adapter 554. When implemented in a WAN networking environment, computer 502 typically includes a modem 556 or other means for establishing communications over wide area network 552. Modem 556, which may be internal or external to computer 502, may be connected to system bus 508 via input/output interfaces 540 or any other appropriate mechanism(s). It is to be appreciated that the illustrated network connections are exemplary and that other means of establishing communication link(s) between computers 502 and 548 may be employed.

In a networked environment, such as that illustrated with computing environment 500, program modules or other instructions that are depicted relative to computer 502, or portions thereof, may be fully or partially stored in a remote memory storage device. By way of example, remote application programs 558 reside on a memory device of remote computer 548. Also, for purposes of illustration, application programs 528 and other executable instructions such as operating system 527 are illustrated herein as discrete blocks, but it is recognized that such programs, components, and other instructions reside at various times in different storage components of computing device 502 (and/or remote computing device 548) and are executed by data processor(s) 504 of computer 502 (and/or those of remote computing device 548).

The methods and processes of FIGS. 2, 4, 6, 7, and 9 are illustrated in flow diagrams that are divided into multiple blocks. However, the order in which the methods and processes are described is not intended to be construed as a limitation, and any number of the described blocks can be combined in any order to implement one or more methods or processes for file system operation and DRM. Furthermore, although the methods and processes are described herein with reference to the various implementations or approaches of FIGS. 1, 3, and 8 (as well as the exemplary system environment of FIG. 5) where applicable, the methods and processes can be implemented in any suitable hardware, software, firmware, or combination thereof and using any suitable network architectures, file system configurations, DRM technologies, and so forth.

Figure 6:
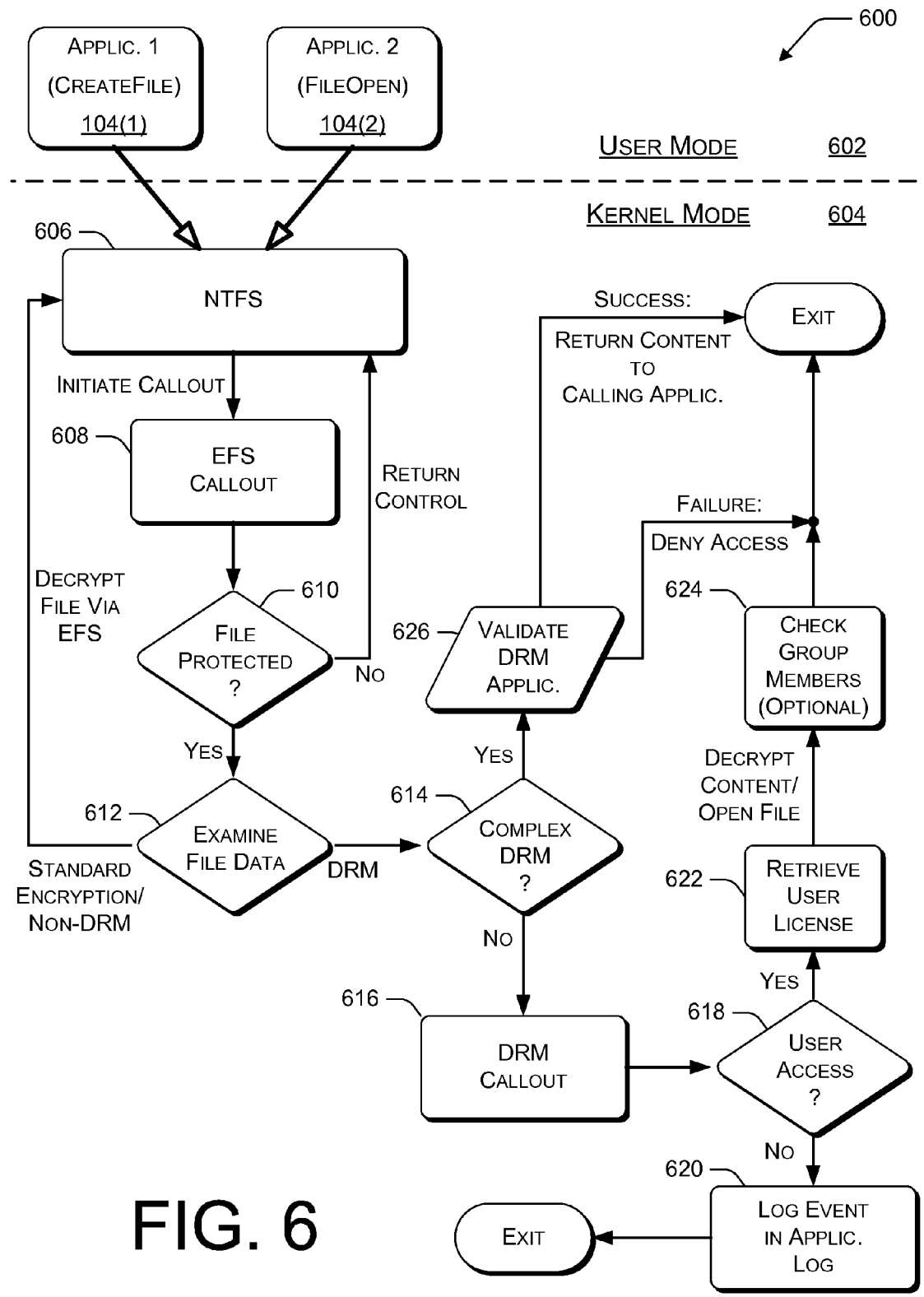
FIG. 6 is a flow diagram that illustrates an exemplary specific process for enabling a file system component to be DRM-aware during file creating/opening.

FIG. 6 is a flow diagram 600 that illustrates an exemplary specific process for enabling a file system component 102 to be DRM-aware during file creating/opening. The exemplary specific process of flow diagram 600 is divided into a user mode portion 602 and a kernel mode portion 604. In user mode portion 602, an application #1 104(1) is creating a file, such as a file 306 (of FIG. 3). Also, an application #2 104(2) is opening a file, such as a file 306. These create file and open file operations instigate interaction with a file system, such as one or more file system components 102. The remainder of the process of flow diagram 600 occurs within kernel mode portion 604.

In kernel mode portion 604 at block 606, a file system "NTFS" receives these operational requests. "NTFS" is an acronym for the New Technology File System of a Microsoft® Windows® operating system such as Windows XP. NTFS initiates a callout to "EFS" to determine whether the file to be created or opened is to be protected or is already protected, respectively, at block 608. "EFS" is an acronym for Encrypting File System, which is also present in certain Microsoft® Windows® operating systems such as Windows XP. Although the described implementation refers specifically to NTFS and EFS, alternative operating systems and/or operating system components may be employed for any of the described methods, approaches, and processes. For example, any file system with a file folder encryption component, driver, and/or functionality may be used.

NTFS may alternatively only initiate a callout to EFS (at block 608) if NTFS cannot directly manipulate (e.g., open) the relevant file. However, in a described implementation at block 610, EFS determines whether the file is protected. If the file is not protected, then control is returned to NTFS 606 with no action being taken by EFS. If the file is protected (as determined at block 610), EFS examines the file data at block 612 to determine the type of protection. If the protection is a standard encryption or other non-DRM protection, then EFS decrypts the file and the decrypted file is returned to NTFS 606.

If, on the other hand, the examination of the file data (at block 612) indicates a DRM type protection, then it is determined at block 614 whether the DRM protection is complex. If the DRM content controls are not complex, then a callout to a DRM module or other functionality is initiated at block 616. Because the DRM content controls are not complex, EFS and NTFS can enforce the DRM content controls. However, the DRM functionality still determines whether the user has access rights to the file at block 618. The user is usually the human user, but it may optionally be the requesting application 104 from user mode portion 602. If the user does not have access rights, the event is logged in an application (or security) log for security purposes at block 620, and process 600 may terminate, optionally after returning some type of error code or status to the requesting application 104.

If, on the other hand, the user is determined to have access rights (at block 618), then the user license is retrieved at block 622. In order to retrieve the user license and/or verify user access rights, group membership (or other authorization data) may be checked at block 624 (as indicated by connection "A"). After the user license is retrieved (at block 622), the content of the file is decrypted. After content decryption and file opening, process 600 may terminate.

Returning to block 614, if the DRM content controls are determined to be complex, then the requesting application 104 is validated from a DRM perspective at block 626. In other words, whether the requesting application 104 is a trusted DRM application that has been appropriately signed is validated. The requesting application 104 may be validated as a trusted DRM application, for example, by referring to its manifest, which lists and/or defines the binaries associated with an application and is frequently digitally signed.

Although block 626 is an optional block, performing these action(s) at the file system level may limit or even prevent some brute force attacks on the DRM functionality. If the validation fails, then EFS/NTFS denies to the calling application 104 access to the file. If the validation succeeds, the content (unaltered) is returned to the calling application 104. Hence, the validated and DRM-aware calling application 104 may interact with the DRM functionality and enforce the complex DRM controls. Regardless of whether the requesting application 104 is validated, process 600 may terminate thereafter.

Figure 7:
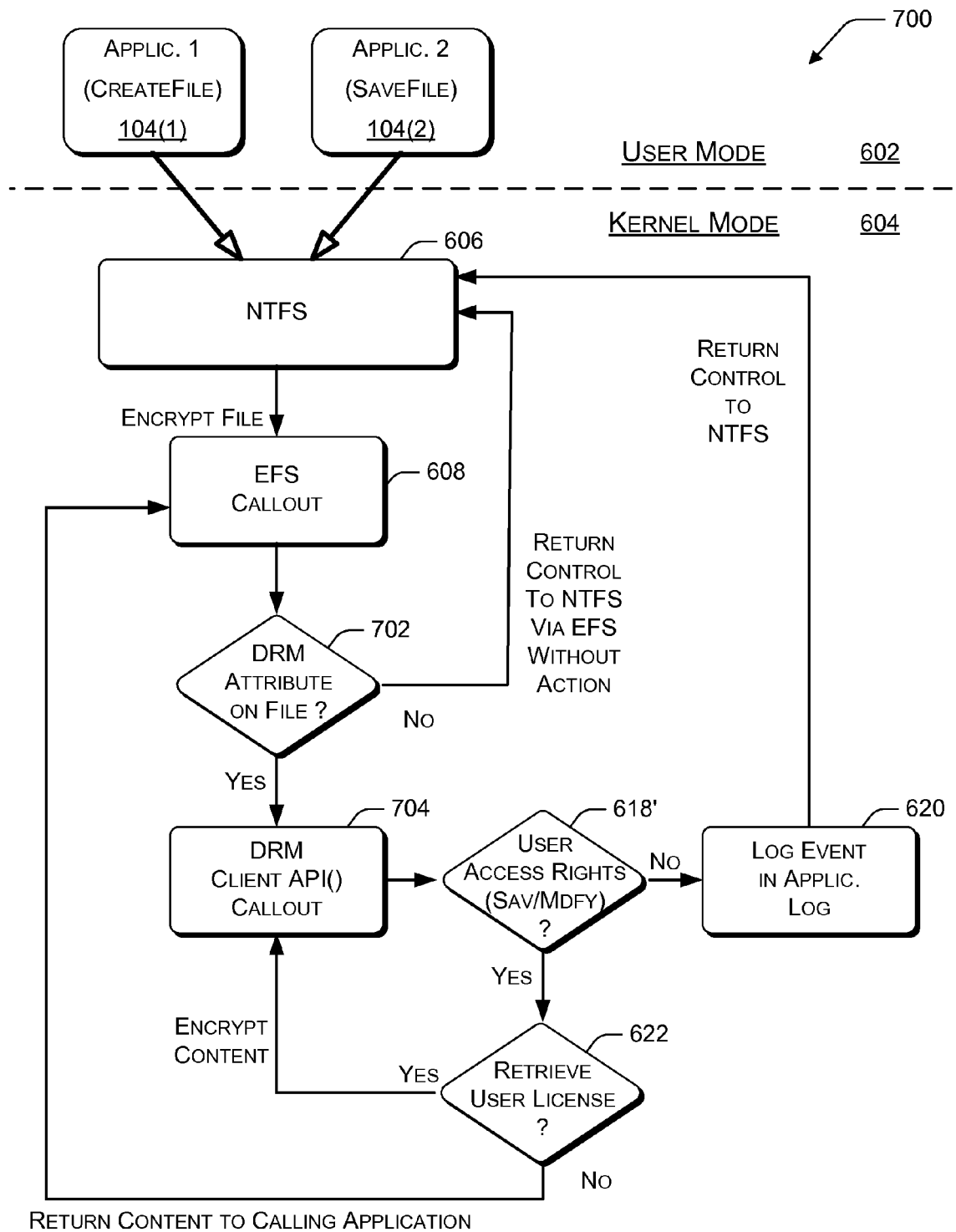
FIG. 7 is a flow diagram that illustrates an exemplary specific process for enabling a file system component to be DRM-aware during file creating/saving.

FIG. 7 is a flow diagram 700 that illustrates an exemplary specific process for enabling a file system component 102 to be DRM-aware during file creating/saving. Generally, applications that are not DRM-aware or that are not aware that particular content is or is to be protected call the standard file system (e.g., NTFS in FIGS. 6 and 7) Application Programming Interfaces (APIs) to save the file, append to the file, modify a block of the file content, and so forth. The file system performs a callout to an abstraction layer (e.g., an EFS module, part, driver, etc. in FIGS. 6 and 7) to examine the content and determine if it contains one or more tags that indicate that it is or should be protected by the DRM functionality. If the content is tagged with DRM attributes for DRM content controls, the abstraction layer acts on behalf of the application to call the DRM client APIs to obtain a license, encrypt the content, and so forth.

Specifically, the exemplary process of flow diagram 700 is divided into user mode portion 602 and kernel mode portion 604. In user mode portion 602, application #1 104(1) is creating a file, and application #2 104(2) is saving/modifying a file, such as a file 306 (of FIG. 3). Saving in the abstract can refer to creating and then writing a file, opening or reading an existing file and then writing changes thereto, and so forth. These create file and save file operations instigate interaction with a file system, such as one or more file system components 102. The remainder of the process of flow diagram 700 occurs within kernel mode portion 604.

In kernel mode portion 604 at block 606, a file system component NTFS receives these operational requests. NTFS initiates a callout to EFS to determine whether the file to be created or saved/modified is to be protected or is already protected, respectively, at block 608. NTFS may alternatively only initiate a callout to EFS (from block 606 to block 608) if NTFS knows that the relevant file is to be encrypted in accordance with some scheme, which may or may not be related to DRM.

Regardless, in this described implementation at block 702, EFS determines whether there is a DRM attribute for the file. If there is no DRM attribute associated with the file, then control is returned to EFS. One of at least two options may occur at EFS (at block 608). First, if other (non-DRM) encryption protection is appropriate, EFS may effectuate such encryption before returning control to NTFS. Second, if no encryption is appropriate, EFS returns control to NTFS without any encryption action being taken by EFS. If, on the other hand, there is a DRM attribute associated with the file (as determined at block 702), a callout to a DRM client API( ) is performed to activate the DRM functionality at block 704.

At block 618, the DRM client determines whether the current user context has access rights to the file, and, if so, whether such rights include saving/modifying the DRM-controlled content. If the current user context does not include saving/modifying access rights, then the attempted manipulation of DRM-controlled content fails and the event is logged in an application (or security) log at block 620. Thereafter, control is returned to NTFS (at block 606). If, on the other hand, the current user context does include saving/modifying access rights (as determined at block 618), then a user license is retrieved at block 622.

When a user license is successfully retrieved (at block 622), the DRM-controlled content is encrypted by the DRM client (of block 704). Also, the DRM-controlled content may be returned to the calling application via EFS (of block 608) and/or NTFS (of block 606). Although illustrated separately, NTFS and EFS may have no logical or actual division within a file system component or components.

File system operation with DRM may provide a number of possibilities. For example, as described in certain general implementations herein, a file system can abstract and provide a DRM functionality layer to applications that cannot provide DRM content enforcement or are not aware of DRM client APIs on the platform. DRM client subsystems rely on the application being trusted (e.g., digitally signed with an appropriate code) and DRM-aware. By moving the abstraction layer lower (e.g., into the file system), EFS or another encrypting file system component may be considered to be a trusted DRM-aware application. For example, enabling the file system to be DRM-aware allows for an anti-virus program to scan and verify content as being virus-free when that content is DRM protected even if the anti-virus scanner is not DRM-aware.

A file system can also provide a group encryption model for files, applications, and users by combining a file system driver with a DRM client subsystem. Users that have applications that need basic sharing of encrypted content among user groups can obtain seamless group sharing of content through DRM functionality such as a DRM client/server licensing architecture. The DRM client determines access and encrypts/decrypts content based on the license server permissions. Neither the upper-level file system, nor the application, nor the user need be aware of the DRM capability of the lower-level file system because the capability inherently results from using EFS or another encrypting file system component as a DRM-enabled application.

A validation component of a file system may provide additional performance and security enhancements to a file system operation with DRM scheme. For example, when multiple DRM-aware applications are running under the same user context and accessing DRM-protected files, EFS or another encrypting file system component can enhance performance by maintaining a user context cache to the DRM client for validating users and obtaining licenses for DRM-controlled content on behalf of such users. In other words, after a DRM-aware application initially retrieves a license for DRM-controlled content, other DRM-aware applications that are operating in the same or joint user context may benefit from the cached validation and licensing retrieval.

An encrypting file system component such as EFS can also ensure that even DRM-aware applications are validated prior to returning protected content. Even if the content is protected with rich DRM controls, the EFS component may refuse to return any content, whether still encrypted or not, to an application that is not trusted as evidenced by the possession of a valid code signature in the application. This can limit or prevent an un-trusted application from acquiring encrypted content and then performing brute force attacks thereon. This is also described further above with reference to block 626 of FIG. 6.

Figure 8:
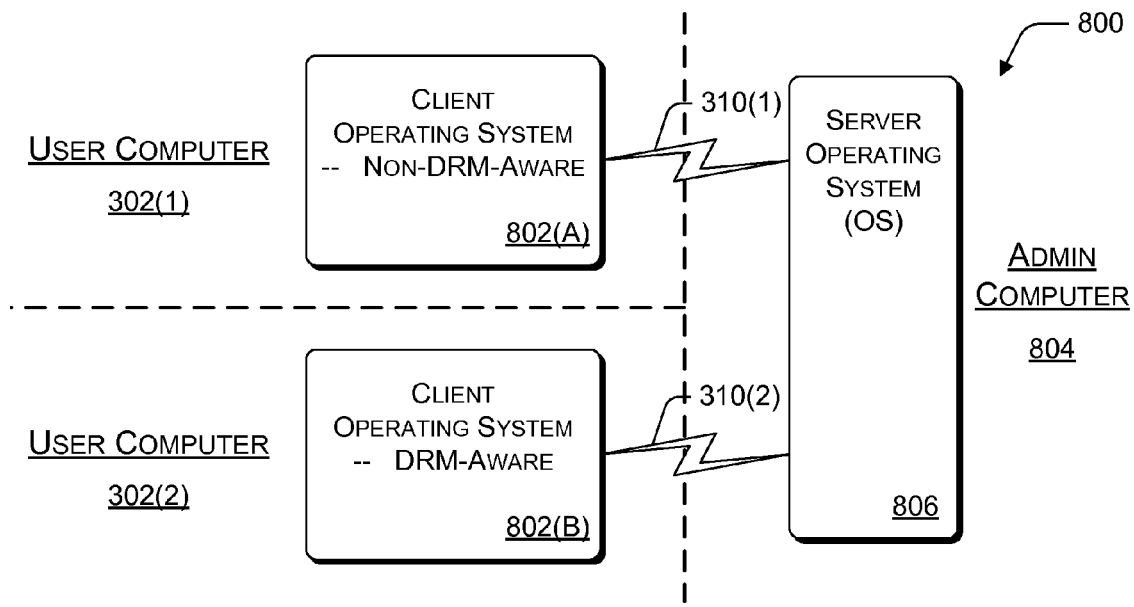
FIG. 8 illustrates an exemplary general approach to client/server operating system (OS) interaction and DRM.

FIG. 8 illustrates an exemplary general approach 800 to client/server operating system (OS) interaction and DRM. A first user computer 302(1) having a client OS that is not DRM-aware 802(A) and a second user computer 302(2) having a client OS that is DRM-aware 802(B) are illustrated. An administrative computer 804 having a server OS 806 is also illustrated. In this described implementation, server OS 806 is DRM-aware. Although the computer having server OS 806 is illustrated as an administrative computer 804, it may alternatively be any general server computer.

Server OS 806 is communicating with non-DRM-aware client OS 802(A) of user computer 302(1) via communication link 310(1) and with DRM-aware client OS 802(B) of user computer 302(2) via communication link 310(2). Server OS 806 interacts with non-DRM-aware client OS 802(A) and DRM-aware client OS 802(B) differently because of their differing DRM-aware statuses.

Specifically, DRM-controlled content is sent from server OS 806 to DRM-aware client OS 802(B) unaltered so that it may handle the DRM-controlled content locally at user computer 302(2). For example, DRM-aware client OS 802(B) may appropriately handle DRM-controlled content using a DRM client 308 (of FIG. 3) and/or one or more DRM-aware file system components 102.

However, with non-DRM-aware client OS 802(A), server OS 806 first handles any possible license acquisition and content decryption prior to sending the content to non-DRM-aware client OS 802(A) provided that server OS 806 is capable of enforcing the DRM controls. These controls may correspond to simple DRM content controls 110 (of FIG. 1). By providing decrypted DRM-controlled content to non-DRM-aware client OS 802(A), server OS 806 enables legacy, non-DRM-aware client OS 802(A) to access/manipulate/use/ etc. the DRM-controlled content.

Figure 9:
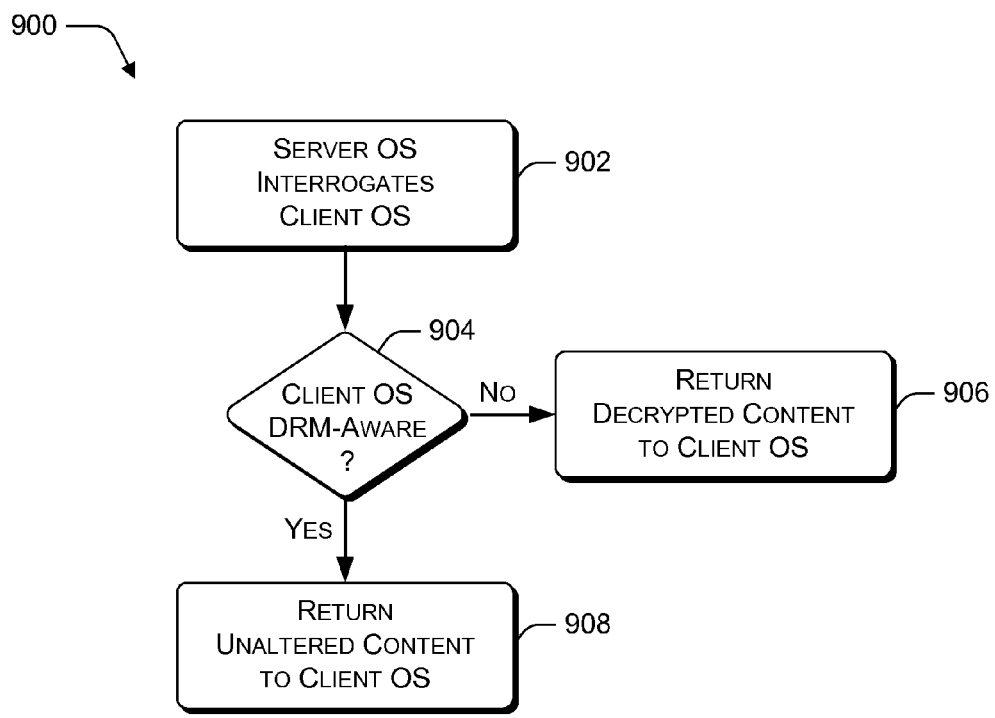
FIG. 9 is a flow diagram that illustrates an exemplary general method for client/server OS interaction with DRM.

FIG. 9 is a flow diagram 900 that illustrates an exemplary general method for client/server OS interaction with DRM. Flow diagram 900 includes four (4) blocks 902-908. Actions for these blocks 902-908 may be performed, for example, by a server OS 806 (of FIG. 8) in conjunction with a non-DRM-aware client OS 802(A) and a DRM-aware client OS 802(B), along with their respective computers 804, 302(1), and 302 (2).

At block 902, a server OS interrogates a client OS. For example, the server OS 806 may interrogate the non-DRM-aware client OS 802(A) and/or the DRM-aware client OS 802(B). At block 904, the server OS determines through the interrogation (and optionally a verification) whether the client OS is DRM-aware. For example, the server OS 806 may determine that the client OS 802(A) is not DRM-aware and that the client OS 802(B) is DRM-aware. Alternatively, this determination may be a result of an affirmative assertion by the DRM-aware client OS 802(B) (e.g., via a (verifiable) DRM-capable indicator sent from the DRM-aware client OS 802(B) to the server OS 806).

If it is determined that the client OS is not DRM-aware (at block 904), then requested content that is DRM-protected is returned to the client OS in a decrypted form at block 906. For example, the server OS 806 may return content with simple DRM controls in a decrypted form to the non-DRM-aware client OS 802(A). If, on the other hand, it is determined that the client OS is DRM-aware (at block 904), then requested content that is DRM-protected is returned to the client OS in an unaltered or raw binary form at block 908. For example, the server OS 806 may return DRM-controlled content in an unaltered form to the DRM-aware client OS 802(B).

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. One or more electronically-accessible storage media devices comprising electronically-executable instructions that, when executed, direct an electronic apparatus to perform actions comprising:
   receiving a request for a file, the request received by a program in a kernel mode and sent by an application in a user mode;
   examining the requested file for digital rights management (DRM) controls;
   ascertaining whether the requested file is associated with at least one complex DRM content control;
   if the requested file is associated with at least one complex DRM content control then validating whether the requesting application is a trusted DRM application that has been appropriately signed, and if signed, returning content to the application in the user mode without decryption; otherwise
   if the requested file is not associated with at least one complex DRM content control, performing actions comprising:
      determining whether a user has access to the requested file, the determining based on DRM; and
      if the user is determined to have access to the requested file, then decrypting the requested file; and otherwise
      if the user is not determined to have access to the requested file, then terminating the received request;
   wherein at least the actions of examining and ascertaining are performed by one or more file system components within the kernel mode.

2. The one or more electronically-accessible storage media devices comprising the electronically-executable instructions that, when executed, direct an electronic apparatus to perform the actions as recited in claim 1, wherein the one or more file system components comprise at least one encryption component of an operating system.

3. The one or more electronically-accessible storage media devices comprising the electronically-executable instructions that, when executed, direct an electronic apparatus to perform the actions as recited in claim 1, wherein the user corresponds to at least one of a human user and an application.

4. The one or more electronically-accessible storage media devices as recited in claim 1, wherein
   the request for the file is via an application programming interface (API) call to a file system component to access the requested file.

5. The one or more electronically-accessible storage media devices as recited in claim 1, wherein the electronically-executable instructions, when executed, direct an electronic apparatus to perform, if the user is determined to have access to the requested file and prior to the action of decrypting, a further action comprising:
   retrieving a license corresponding to a current user context from a DRM license server.

6. The one or more electronically-accessible storage media devices comprising the electronically-executable instructions that, when executed, direct an electronic apparatus to perform the actions as recited in claim 5, wherein the action of retrieving comprises the action of:
   checking a group for membership or other authorization data with respect to the current user context.

7. The one or more electronically-accessible storage media devices as recited in claim 1, wherein the electronically-executable instructions, when executed, direct an electronic apparatus to perform a further action comprising:
   if the user is determined not to have access to the requested file, logging a failed access attempt in an application or security log.

8. The one or more electronically-accessible storage media devices as recited in claim 1, wherein the electronically-executable instructions, when executed, direct an electronic apparatus to perform further actions comprising:
   if the requested file is associated with at least one complex DRM content control, performing actions comprising:
      attempting to validate a requesting application from a DRM perspective; and
      if the requesting application fails to be validated, denying the requesting application access to the requested file.

9. The one or more electronically-accessible storage media devices comprising the electronically-executable instructions that, when executed, direct an electronic apparatus to perform the actions as recited in claim 8, wherein the requesting application comprises a DRM-aware application.

10. The one or more electronically-accessible storage media devices as recited in claim 1, wherein the electronically-executable instructions, when executed, direct an electronic apparatus to perform further actions comprising:
    if the requested file is associated with at least one complex DRM content control, performing actions comprising:
       attempting to validate a requesting application from a DRM perspective; and
       if the requesting application is successfully validated, providing the requested file in an unaltered form to the requesting application.

11. One or more electronically-accessible storage media devices comprising electronically-executable instructions that, when executed, direct an electronic apparatus to perform actions comprising:
    receiving a request for a file, the request received by a program in a kernel mode and sent by an application in a user mode;
    ascertaining whether the requested file has a digital rights management (DRM) attribute associated therewith;
    if the requested file does not have a DRM attribute associated therewith, performing actions comprising:
       if the requested file is encrypted, then decrypting the requested file; and
       if the requested file is not encrypted, then forwarding the request for the file to a file system;
    if the requested file has DRM content controls that are not complex, performing actions comprising:
       determining whether the user has either saving or modifying access rights to the requested file; and
       if the user is determined to have either saving or modifying access rights to the requested file, decrypting the requested file; and otherwise
       if the user is determined to have neither saving nor modifying access rights to the requested file, then terminating the received request;
    if the requested file is associated with at least one complex DRM content control, then validating whether the requesting application is a trusted DRM application that has been appropriately signed, and if signed, returning content to the application in the user mode without decryption;

wherein at least the action of ascertaining is performed by one or more file system components within the kernel mode.

12. The one or more electronically-accessible storage media devices comprising the electronically-executable instructions that, when executed, direct an electronic apparatus to perform the actions as recited in claim 11, wherein the user corresponds to at least one of a human user and an application.

13. The one or more electronically-accessible storage media devices comprising the electronically-executable instructions that, when executed, direct an electronic apparatus to perform the actions as recited in claim 11, wherein the request for the file is via an application programming interface (API) call to a file system component to access the requested file.

14. The one or more electronically-accessible storage media devices as recited in claim 11, wherein the electronically-executable instructions, when executed, direct an electronic apparatus to perform, if the user is determined to have either saving or modifying access rights to the requested file, further actions comprising:

retrieving a license corresponding to the user from a DRM authorization provider; and using the license to protect the requested file.

15. The one or more electronically-accessible storage media devices as recited in claim 11, wherein the electronically-executable instructions, when executed, direct an electronic apparatus to perform a further action comprising:

if the user is determined to have either saving or modifying access rights to the requested file, returning at least the content of the requested file to a requesting application.

16. The one or more electronically-accessible storage media devices as recited in claim 11, wherein the electronically-executable instructions, when executed, direct an electronic apparatus to perform a further action comprising:

if the user is determined to have neither saving nor modifying access rights to the requested file, logging a failed access attempt on the requested file in an application or security log.

17. A method for file system operation and digital rights management, comprising:

receiving a request for a file, the request received by a program in a kernel mode and sent by an application in a user mode;

examining the requested file for digital rights management (DRM) controls;

ascertaining whether the requested file is associated with at least one complex DRM content control;

if the requested file is associated with at least one complex DRM content control then validating whether the requesting application is a trusted DRM application that has been appropriately signed, and if signed, returning content to the application in the user mode without decryption; otherwise if the requested file is not associated with at least one complex DRM content control, performing actions comprising:

determining whether a user has access to the requested file, the determining based on DRM; and if the user is determined to have access to the requested file, then decrypting the requested file; and otherwise if the user is not determined to have access to the requested file, then terminating the received request;

wherein at least the actions of examining and ascertaining are performed by one or more file system components within the kernel mode.

18. The method as recited in claim 17, wherein the one or more file system components comprise at least one encryption component of an operating system.

19. The method as recited in claim 17, wherein the user corresponds to at least one of a human user and an application.

20. The method as recited in claim 17, wherein the request for the file is via an application programming interface (API) call to a file system component to access the requested file.

* * * * *

UNITED STATES PATENT AND TRADEMARK OFFICE
CERTIFICATE OF CORRECTION

PATENT NO. : 8,117,666 B2  
APPLICATION NO. : 12/131884  
DATED : February 14, 2012  
INVENTOR(S) : Cross et al.

Page 1 of 1

It is certified that error appears in the above-identified patent and that said Letters Patent is hereby corrected as shown below:

In the Specification

In column 6, line 35, delete "are" and insert -- area --, therefor.

In the Claims

In column 16, line 60, In Claim 11, delete "decrypting" and insert -- encrypting --, therefor.

Signed and Sealed this  
Sixteenth Day of December, 2014

Michelle K. Lee  
*Deputy Director of the United States Patent and Trademark Office*